United States Patent [19]

Huschka et al.

[11] 4,028,181

[45] June 7, 1977

[54] FUEL PARTICLES WITH COATINGS WITHOUT PROPERTY GRADIENTS

[75] Inventors: Hans Huschka, Grossauheim; Hermann Schmutz, Hanau; Peter Vygen, Kalberau, all of Germany

[73] Assignee: Nukem G.m.b.H., Wolfgang near Hanau am Main, Germany

[22] Filed: Apr. 3, 1974

[21] Appl. No.: 457,618

Related U.S. Application Data

[63] Continuation-in-part of Ser. No. 162,225, July 13, 1971, abandoned.

[30] Foreign Application Priority Data

July 23, 1970 Germany .......................... 2036545

[52] U.S. Cl. .............................. 176/82; 176/91 SP; 427/6; 427/213; 427/215; 427/249
[51] Int. Cl.² ............................................ E21B 7/04

[58] Field of Search ............ 117/46, 169 R, DIG. 6; 427/249, 213, 215, 6; 176/82, 91 SP

[56] References Cited

UNITED STATES PATENTS

| 3,231,408 | 1/1966 | Huddle | 117/46 CG |
| 3,617,342 | 11/1971 | Preston | 117/46 CG |
| 3,736,169 | 5/1973 | Graham et al. | 117/46 CG |

*Primary Examiner*—Ronald H. Smith
*Assistant Examiner*—Janyce A. Bell
*Attorney, Agent, or Firm*—Cushman, Darby & Cushman

[57] ABSTRACT

Fuel particles in a fluidized bed are provided with a coating of pyrolytic carbon having substantially no property gradients by holding the speed of growth constant during the entire coating time and insuring the same speed of growth in all particles of the particle bed.

4 Claims, 3 Drawing Figures

THE BED VOLUME CORRESPONDS TO
THE VOLUME OF THE CHARACTERISTIC
COATING ZONE.

FUEL PARTICLES WITH COATINGS WITHOUT PROPERTY GRADIENTS

This is a continuation-in-part of application Ser. No. 162,225 filed July 13, 1971 and now abandoned.

Fuel elements for high temperature reactors costomarily contain the fuel in the form of coated particles. For this purpose spherical fuel particles of uranium or thorium oxide or carbide were produced which were encased in coatings of pyrolytic carbon alone or in combination with silicon carbide. The diameter of such particles lies between 100 and 1000 $\mu$. The coating is obtained customarily in fluidized beds by thermal decomposition of hydrocarbons. These coatings have the function of retaining the fuel and the fission products formed in the nuclear burn up in the individual particles themselves. From this there results the requirement that these coatings both endure the fuel element production and also undergo no damage during the nuclear burn up.

It has been proven that especially the fast neutron dose has a considerable influence on the layers of pyrocarbon; the pyrocarbon shrinks, the fuel particles expand and strains occur, which lead to the formation of fissures in the coating. To overcome these difficulties there has been tried the setting up of successive individual layers with differing properties. Thus, for example, there have been formed carbide particles coated with two layers, oxide particles with three layers from pyrolytic carbon and oxide particles with five layers from pyrolytic carbon and silicon carbide (M.S.T. Price et al., Journ. Brit. Energy Soc. 5(1966), page 361).

It has next been recognized that pyrocarbon layers under neutron bombardment break even without interaction with the inner part of the particles, namely when they are strongly anisoptropic, Through model calculations it was shown that inner strains occur in such coatings which lead to facture. (Literature, for example, J. W. Prados and J. L. Scott, Nuclear Applications 2(1966), page 402).

The degree of the anisotropy of a particle layer is given by the Bacon anisotropy factor which is measured on the corresponding layers on the graphite platelets, which were mixed with the concerned particle charge during the coating. The anisotropy factor increases with increasing anisotropy and is equal to 1.0 for fully isotropic layers. A discussion of isotropy in pyrolytic graphite constituting fuel particle jackets may be found in U.S. Pat. No. 3,361,638. In irradiation tests it has now been proven that a lower Bacon anisotropy factor is indeed necessary for a good irradiation behavior, but is not sufficient, for example among particle varieties with a Bacon factor <1.05 and other identical properties there are those with a neutron dose of $1.2 \times 10^{22}$ which are intact as well as those with the same dose where the coatings are broken (Literature: "Irradiation Experiment DN 2 in the Dounreay Fast Reactor", Baier et al., Euratom Report to be published)

The resulting experiments led to the present invention which depends on the knowledge that the specification of the average Bacon factor and other average properties over the layer do not suffice for the characterization of the layer quality but that the property gradients present in the particle layers play a decision roll in the irradiation behavior. These gradients not observed until now can only be avoided by specially regulating the coating process while maintaining specific boundary conditions. To make these problems understandable it is necessary to go more closely into the coating process.

The particles are placed in a fluidized bed for coating. In the simplest case this consists of an upright, heated tube with a conical bottom. A nozzle through which the carrier gas (argon or helium) necessary for the fluidizing and the coating gas (for example methane, propylene and acetylene) discharges into the tip of the cone. The hydrocarbon gas is heated up upon entering the bed and decomposes over several intermediate steps to carbon and hydrogen. The properties of the carbon deposited on the particles depend on the temperature and the amount of the hydrocarbon gases supplied; which supplied gas mixture results from the concentration and the total gas throughput or the velocity of flow. In addition to this, the coating depends on the total surface area of the fluidized particles on which area the pyrolytic graphite is deposited, as set forth in the aforementioned U.S. Pat. No. 3,361,638. By holding these coating parameters constant during the entire coating process by regulating the flow of gas mixture and the temperature by adjustment to constant values there is obtained for each point in time of coating fixed speed of growth together with the fixed layer properties; see U.S. Pat. No. 3,247,008.

It has now been recognized that there are two causes which produce changes in speed of growth and layer properties during a coating process.

1. During the coating process, the particle diameters and hence the surface areas of the particles increase. At constant coating gas flow the speed of growth of the particles decreases with time and there is a continual change in the properties of the particles in their radial directions. That is, the properties of the deposited layer change with a change in the speed of growth of the layer.

2. The second cause of property variations in the coating is the occurrence of variations of the coating conditions in different parts of the fluidized bed, which especially can be found in relatively large coating equipment. The coating gas which enters the fluidized bed decomposes while it flows through the particle bed, so that the coating concentration in the upper part of the bed is smaller than in the lower part. Parallel to the concentration gradient there occur more or less strong temperature gradients. Because of the different coating conditions present at different places of the particle bed there also occur at these places different speeds of growth and layers where widely different properties are formed. The individual particles also pass through the individual coating zones according to the speed of agitation and the entire coating consists of a series of thin individual layers of different properties.

These property changes in the deposited coating layer, proceeding uniformly or alternating, can be shown with a process developed by SGAE-Seibersdorf for measuring the optical anistropy factor (OAF-value). The measured values are standardized to the values of the Bacon Anisotropy Factor (BAF-value), which corresponds to the ratio of thermal expansion in both main directions of the measuring plane and which is obtained by x-ray measurements (G.E. Bacon, Journal Appl. Chem., Vol. 6, 1956, page 477).

The invention will be understood best in connection with the drawings wherein.

In reality the OAF-value is not perfectly constant over the coating layer. Variations of several percent, sometimes up to ±5 percent in the coating layer of a given particle can occur due to statistical variations in moment of deposition. The magnitude of these statistical variations depends on the general coating conditions and usually is not more than a few percent.

Both types of property gradients determine besides the average values over the layer of all the layer properties the irradiation behavior of the particles.

In the specific examples the particles coated were uranium-thorium-oxide kernels with triplex coating.

DO 357K consists of a $(U, Th)O_2$ kernel with a porous layer, a sealing layer, and a HDI-layer (High Density Isotropic layer). In the following discussion, the measurements of isotropic factors in manifold coated particles always relate to the outer HDI-layer.

Charge WM 381 consists of a $UC_2$ kernel with a duplex coating of porous layer and HDI-layer. The temperature of deposition of the outer HDI coating layer with DO 357K was 2060° C. and with WM 381 was 1900° C.

For the production of gradient-free layers, the following conditions are required.

a. The speed of growth must be constant during the entire coating time (see FIG. 1).

b. The speed of growth must be of the same size in all parts of the particle bed.

Figure 1:
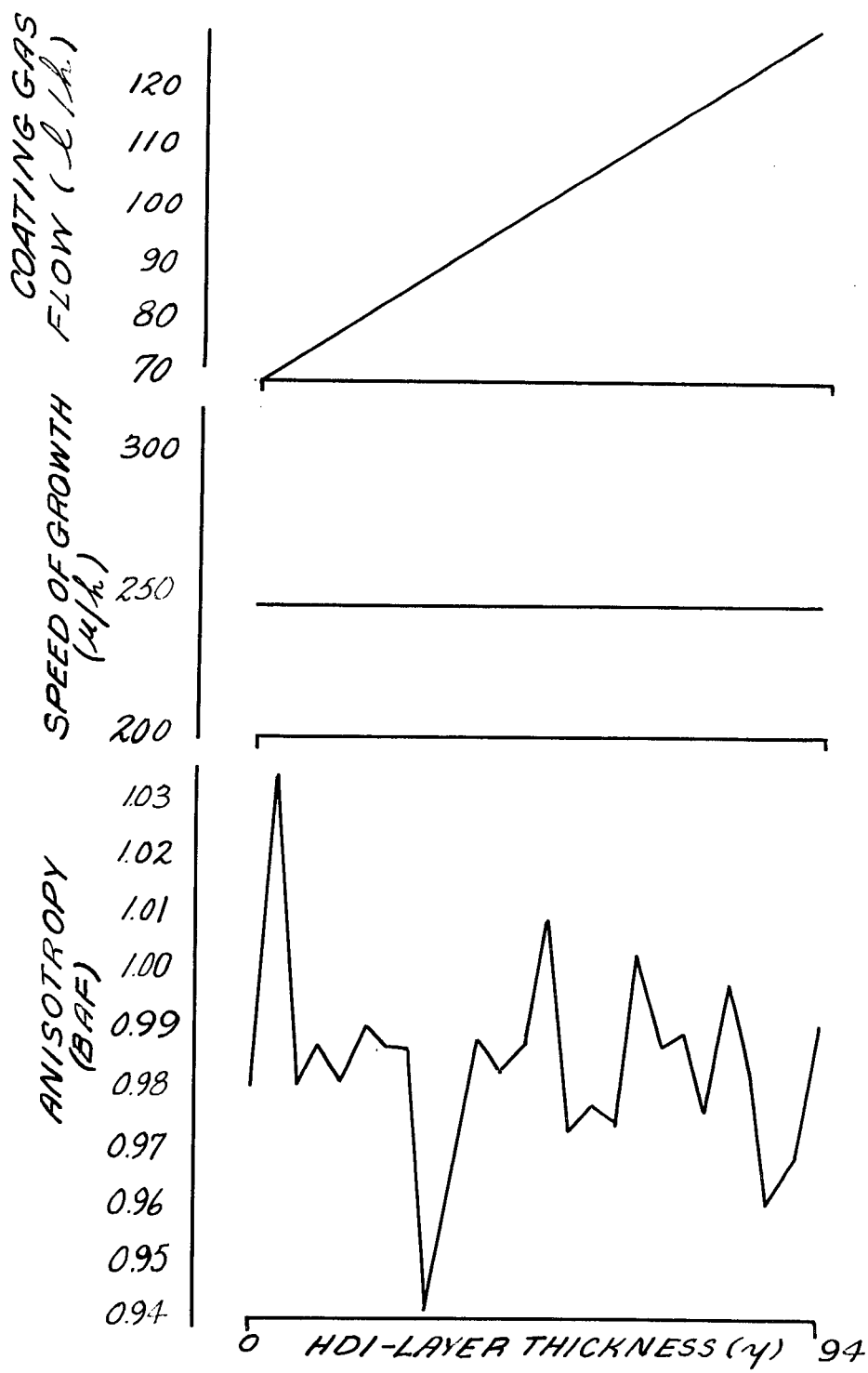
FIG. 1 shows in the example of coating charge DO 357K the alternating variations of anisotropy at constant speed of growth.

Maintaining the condition (a) can be attained, for example, in a simple manner in which either particles are continuously drawn off and so the total particle surface area held constant with the coating time, or the coating gas flow is continuously adjusted to the growing particle surface area. In the first case, both the flow of coating gas and the total particle surface area are kept constant. Therefore, the ratio of coating gas per unit of time to the coating surface area is constant, and thereby the rate of growth is kept constant as demanded by condition (a). In the second case, the coating gas flow is increased by adjustment in such a way that the ratio of amount of coating gas per unit of time to the coating surface area is kept constant during the coating time. The amount of gas is defined here and in the following by mass in mol or by the corresponding partial volume at standard conditions. In this second case there results the running curve as is shown in FIG. 1, the flow of gas is increased with increase in surface area. Meeting condition (a) by one of these procedures avoids the uniform radially-proceeding change of properties in the coating layer.

Figure 2:
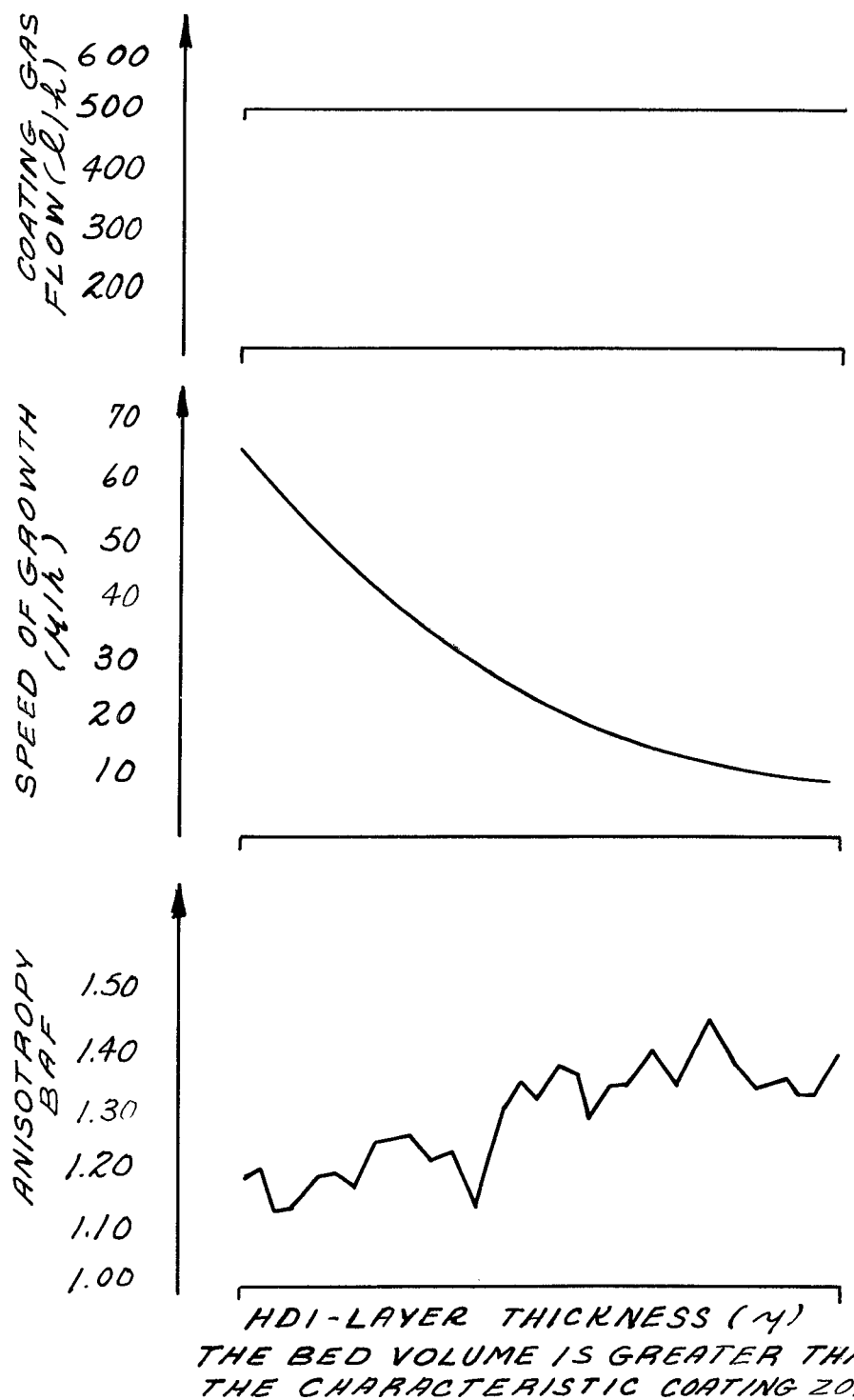
FIG. 2 shows for the coating charge WM 381 the overlaying of alternating variations and the singularly disposed change of anisotropy at falling speeds of growth.
Figure 3:
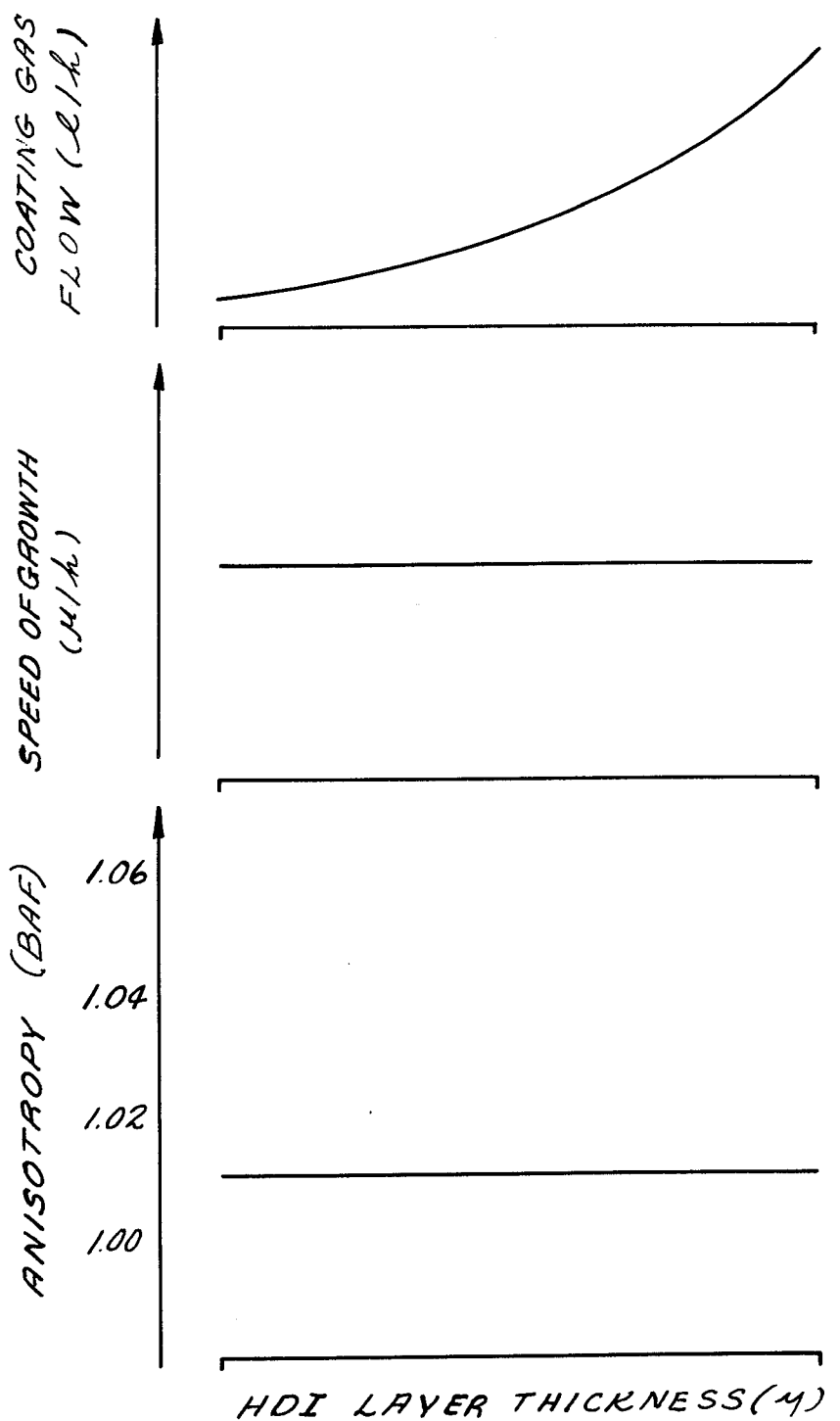
FIG. 3 illustrates in schematic form the situation where the volume of the total particle bed, defined hereinafter, is the same as that of the characteristic coating zone.

The condition (b) requires that the speed of growth in all parts of the particle bed be equally large so that alternating variations (see FIGS. 1 and 2) are avoided. This requirement can only be attained in a conically running bed that flows from a nozzle if the ratio of the working tube cross section to nozzle cross section is ≤ 150 and at the same time the ratio of the volume of the fluidized particles to the volume of the characteristic coating zone is ≤ 1. The volume of the fluidized particles is defined here as that whole volume in the reaction container where during fluidization under coating conditions any particles are in a fluidized state. The characteristic coating zone is defined here as a volume in which the concentration of the coating gas is nearly constant and the deposition can take place under the characteristic conditions whereby on a particle a coating layer or a part of a coating layer is deposited which shows the characteristic properties aimed at for the whole coating layer. Outside of this characteristic coating zone the speed of growth is lower or higher than the characteristic speed of growth. Therefore, on particles staying for a time in such a zone outside the characteristic zone a part of the coating layer is deposited with other than the characteristic properties. In the case illustrated by FIG. 3, the volume of the fluidized particles corresponds to the characteristic coating zone.

The larger beds and the correspondingly larger volume of fluidized particles can take different courses for the purpose of avoiding different coating zones.

A possibility is in the use of a gas introduction tube through which the zone in which any deposition takes place is bounded by the characteristic zone.

Another possibility consists of the use of a flowing bed with manifold nozzles. In this case the characteristic coating zone is enlarged so that all fluidized particles stay in the characteristic coating zone.

For all these geometries there can be defined always an upper and a lower boundary speed of growth which depend on the special coating conditions. In any part of the zone where deposition takes place, the upper or lower boundary speed of growth must not be overstepped or understepped, respectively, if coating layers without alternating properties are to be produced. Each boundary speed of growth relates to a distinct sort of coating material with distinct properties. As stated previously, out of the coating properties in a small part of the coating layer there only can be measured the OAF-value which is related to the Bacon anisotropy factor. Therefore, a lower or upper boundary value of the Bacon anisotropy can be defined, relative to the upper and lower boundary speed of growth, which must not be understepped or overstepped, respectively, if gradient-free layers are to be produced, which are stable in neutron irradiation.

The process of the present invention can be used to coat conventional nuclear fuel particles such as, for example, particles of uranium oxide, thorium oxide, uranium carbide and thorium carbide as set forth above.

EXAMPLE

A batch of 3 kg $(U, Th)O_2$ kernels of 354-420 $\mu$ sieve fraction is coated in a cylindrical tube of 5 inches diameter with a flat cone and a number of nozzles in it. The coating gas (for example methane) is injected through three nozzles in the middle of the flat cone. Inert gas is injected through ring nozzles around these three nozzles and at the same time through a number of holes of different diameter in the cone. By these means and by adapting continuously the coating gas flux to the particle surface it is possible to obtain a constant deposition rate during the coating time of approximately 2 hours. At the same time, number (for example 12), diameter (for example 1, 2 mm and 1.8 mm) and distribution of nozzles over the cone make sure that the deposition rate at different places in the coater is the same. This constant deposition rate is, for example 46 $\mu$/h and permits to get under these conditions coatings without property gradients (see FIG. 3).

What is claimed is:

1. A process for the production of coated nuclear fuel particles in a fluidized bed employing a coating gas and a carrier gas and in which the coating consists of pyrolytic carbon substantially free of radial uniformly disposed and alternating property gradients comprising holding constant the ratio of the amount of coating gas per unit of time to the coating surface area, wherein the ratio of the amount of coating gas per unit of time to the coating surface area is kept constant by drawing off a part of the particules from the fluidized bed during the coatings to hold the total particle surface area constant; thereby keeping the speed of growth the same during the entire coating time and also over the entire coating zone of the fluidized bed and thereby maintaining the fluctuations of the speed of growth within boundaries which boundary speeds are related each to a lower and an upper value of the Bacon Anisotropy Factor wherein said coating step is undertaken in a tube with a conical bottom equipped with nozzles for introducing the coating gas into the tube from the nozzles wherein the ratio of the working tube cross section to nozzle cross section is ≤ 150 and the ratio of the volume of the fluidized particles to the volume of the coating zone is ≤ 1.

2. Coated fuel particles produced by the process of claim 1 having a pyrolytic carbon coating layer substantially free of radial uniformly disposed and alternating property gradients and having a substantially constant Bacon Anisotropy Factor.

3. A process for the production of coated nuclear fuel particles in a fluidized bed employing a coating gas and a carrier gas and in which the coating consists of pyrolytic carbon substantially free of radial uniformly disposed and alternating property gradients comprising holding constant the ratio of the amount of coating gas per unit of time to the coating surface area, wherein the ratio of the amount of coating gas per unit of time to the coating surface area is kept constant by increasing the rate of feed of the coating gas with increase in coating surface area; thereby keeping the speed of growth the same during the entire coating time and also over the entire coating zone of the fluidized bed and thereby maintaining the fluctuations of the speed of growth within boundaries which boundary speeds are related each to a lower and an upper value of the Bacon Anistropy Factor wherein said coating step is undertaken in a tube with a conical bottom equipped with nozzles for introducing the coating gas into the tube from the nozzles wherein the ratio of the working tube cross section to nozzle cross section is ≤ 150 and the ratio of the volume of the fluidized particles to the volume of the coating zone is ≤ 1.

4. Coated fuel particles produced by the process of claim 3, having a pyrolytic carbon coating layer substantially free of radial uniformly disposed and alternating property gradients and having a substantially constant Bacon Anisotropy Factor.

* * * * *